(No Model.)

W. R. PATTERSON.
TELEGRAPH CABLE TERMINAL.

No. 251,729. Patented Jan. 3, 1882.

Witnesses.
William S. Granger.
Chas. A. Warren.

Inventor
William R. Patterson
By George P. Barton
Attorney

UNITED STATES PATENT OFFICE.

WILLIAM R. PATTERSON, OF CHICAGO, ILLINOIS, ASSIGNOR TO THE WESTERN ELECTRIC MANUFACTURING COMPANY, OF SAME PLACE.

TELEGRAPH-CABLE TERMINAL.

SPECIFICATION forming part of Letters Patent No. 251,729, dated January 3, 1882.

Application filed July 14, 1881. (No model.)

*To all whom it may concern:*

Be it known that I, WILLIAM R. PATTERSON, of Chicago, Illinois, have discovered a certain new and useful Improvement in Telegraph-Cable Terminals, of which the following is a full, clear, concise, and exact description.

My invention is an improvement upon the terminal described in Letters Patent No. 233,162, granted me as assignor October 12, 1880.

Figure 3:
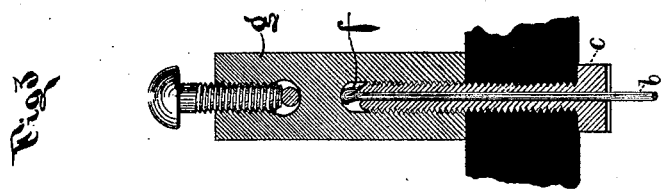
Figure 2:
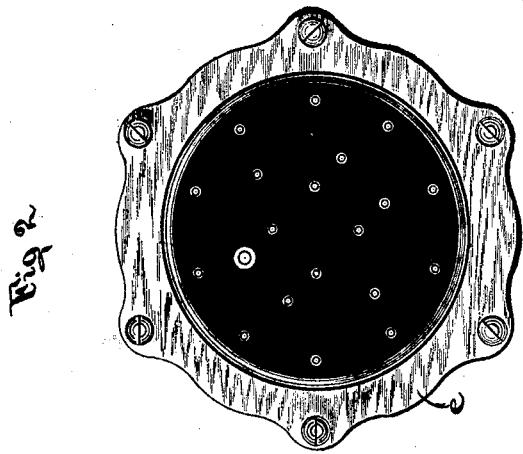
Figure 1:
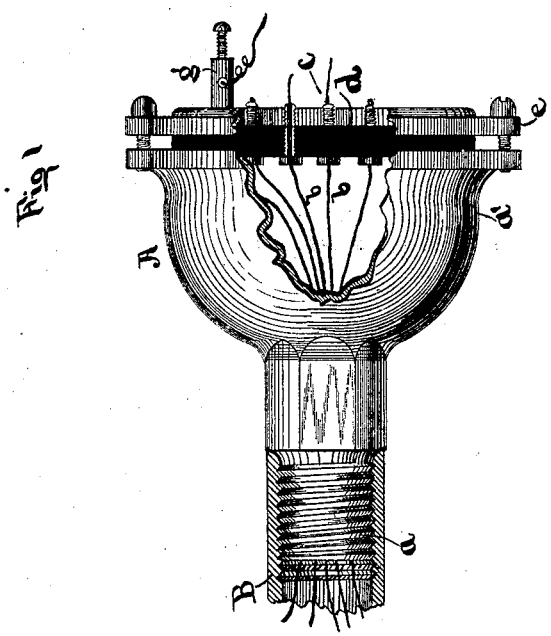

In the drawings, Figure 1 is a side elevation, partly in section, of a terminal embodying my improvement. Fig. 2 is an end view thereof, and Fig. 3 is a detail section of a binding-post.

The smaller end $a$ of cup A is shown screwed into the pipe B of the cable. The cable of conductors should be drawn into the pipe, so that the ends of the conductors will project a few inches beyond the large end $a'$ of the cup, and a gasket of suitable material—as blotting-paper saturated with shellac-varnish—may be placed on the flange of the cup. The wires $b$ are then laid bare down to the plane of the flange and pulled through the hollow pins $c$ in the rubber cap $d$. The cap $d$ is then screwed in the position shown by means of the ring $e$, which may be bolted or screwed to the flange. The ends of the wires are then cut off, say, from one-half to three-fourths of an inch from the ends of the pins, and bent over so as to form a loop, as shown at $f$, Fig. 3. The binding-post $g$, when screwed into place, compresses the loop $f$ against the end of the pin, as shown, the cavity in the binding-post being somewhat deeper than the length of the projecting end of the pin. The wire is thus held securely in place and a most perfect electric contact formed between the wires and binding-posts, while the bottom of the binding-post, coming against the surface of the rubber cap, prevents moisture from penetrating to the interior of the pipe.

In case there are only a few wires—say two or three—to be brought out, the cap may be made in the form of a plug and screwed into the end or side of the pipe.

I claim—

1. The combination of the cap of insulating material with the pipe of the telegraph-cable, hollow pins, one for each conductor, and means whereby the cap is closely fitted to the pipe, substantially as shown and described.

2. The combination of the cap of insulating material, provided with hollow pins, one for each conductor, the cup attached to the pipe of the cable, and the ring and binding-posts, whereby connection may be maintained with the several conductors, substantially as shown and set forth.

3. A binding post provided with a hollow attaching-screw, whereby the post may be attached to an underground conduit and a wire from the interior made fast thereto, and having a binding-screw, by which connection can be made to an exterior conductor, substantially as shown and described.

WILLIAM R. PATTERSON.

Witnesses:
GEORGE P. BARTON,
WILLIAM S. GRANGER.